2 Sheets—Sheet 2.
S. T. BENTLEY & J. ESTEP.
TRACK CLEARERS.
No. 175,646. Patented April 4, 1876.
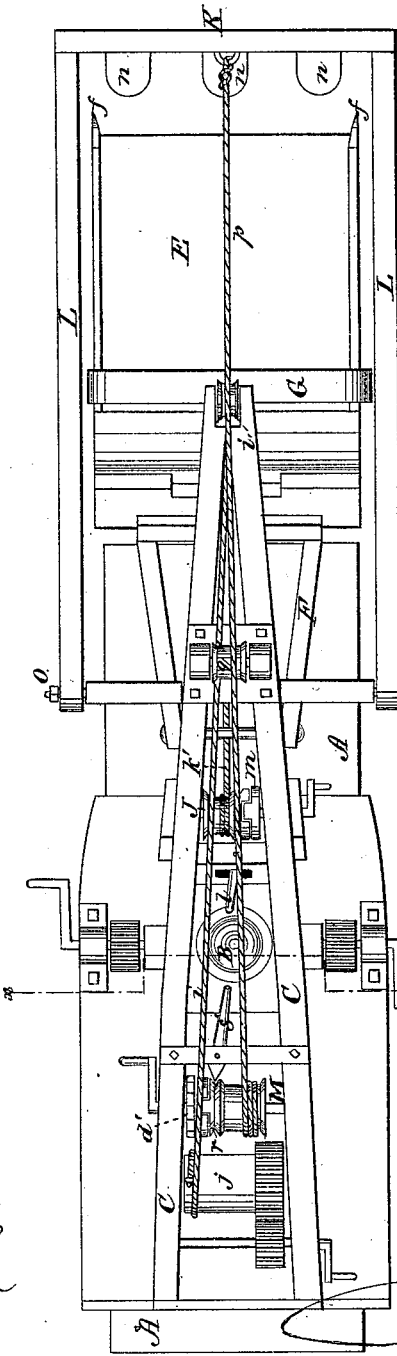
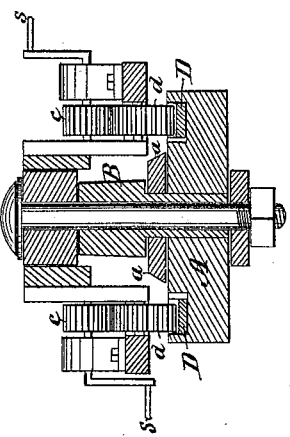
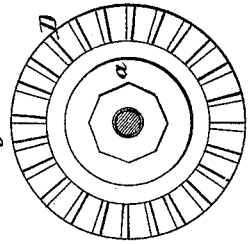
WITNESSES:
W. W. Hollingsworth
Solon C. Kemon
INVENTOR:
S. T. Bentley
J. Estep
BY
ATTORNEYS.

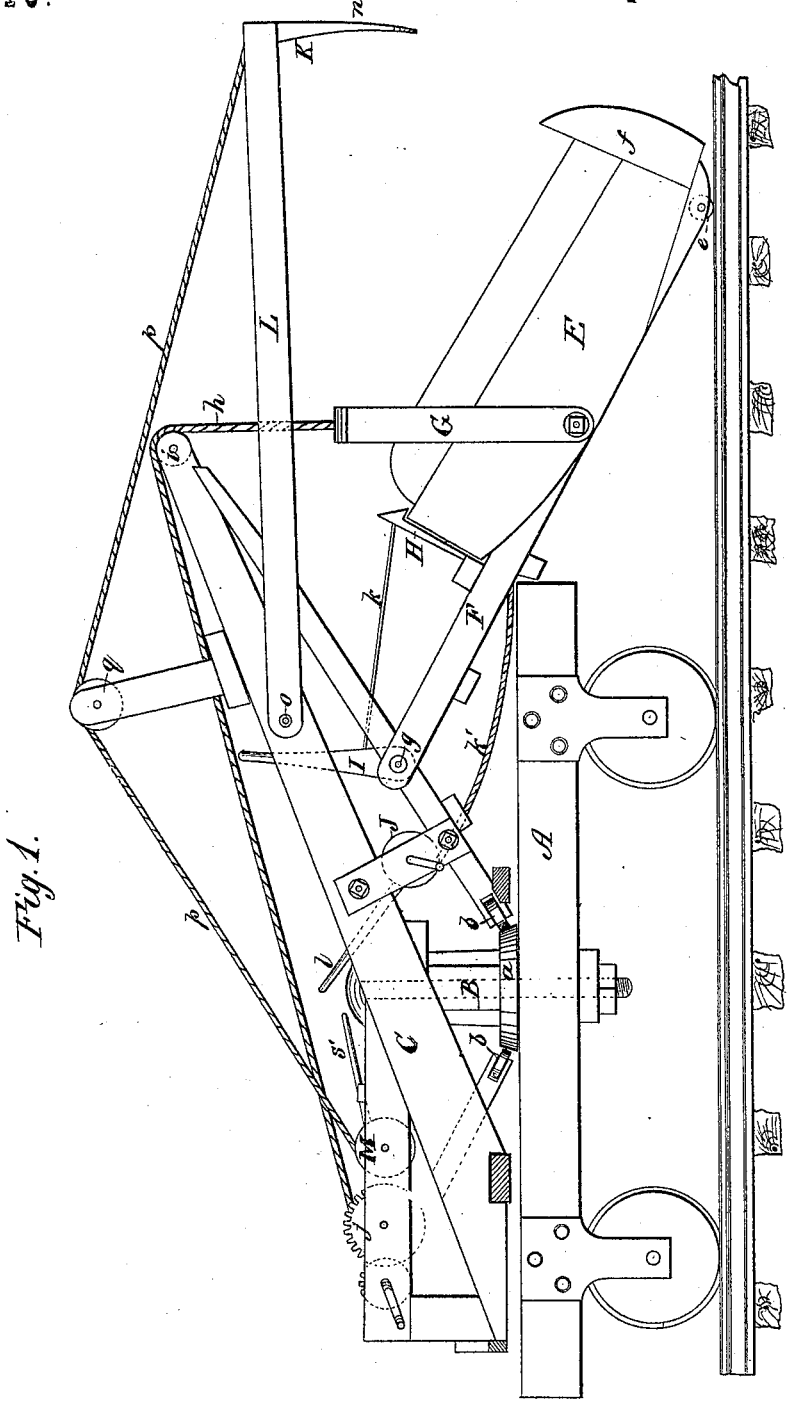

UNITED STATES PATENT OFFICE.

SILAS T. BENTLEY AND JACOB ESTEP, OF UNION, IOWA.

IMPROVEMENT IN TRACK-CLEARERS.

Specification forming part of Letters Patent No. 175,646, dated April 4, 1876; application filed February 21, 1876.

*To all whom it may concern:*

Be it known that we, SILAS T. BENTLEY and JACOB ESTEP, of Union, in the county of Hardin and State of Iowa, have invented a new and Improved Machine for Cleaning Snow from Railroad-Tracks; and we do hereby declare that the following is a full, clear, and exact description of the same, reference being had to the accompanying drawing, forming a part of this specification, in which—

Figure 1 is a vertical side elevation, partly in section; Fig. 2, a plan view; Fig. 3, a vertical transverse section through line $xx$; Fig. 4, a detail of the turn-table.

This invention relates to a novel construction of machine, mounted upon a platform-car, to be used for cleaning snow from railroad-tracks whenever the same becomes blockaded by drifts. It consists in the particular construction of a derrick, mounted upon a platform-car, and pivoted in the center, so as to turn readily to one side, with the devices operating in connection therewith. Said derrick carries at one end a frame-work, in which is pivoted a scoop, which may be raised and lowered by a windlass with pulleys, and a cord attached to a bale on the said scoop. To the derrick above the scoop is pivoted a frame carrying a cut-off for the scoop after it is forced into the snow-bank, which cut-off divides the snow in the scoop from that outside, and is operated through a cord, pulley, and windlass. The rear of the frame carrying the scoop is provided with a spring-catch, with cord and windlass, for dumping and restoring the scoop to its proper position upon its pivots.

In the drawing, A represents an ordinary platform-car, upon which is constructed a strong vertical standard, B, around which the derrick-frame C swings. Around the base of the standard is a circular guideway, $a$, upon which rest friction-wheels $b$, attached to the derrick-frame to hold the same steady. Around said circular guideway, and attached to the top of the car, is a stationary cog-band or wheel, D, with upwardly-projecting teeth, and upon said cogs rest wheels $c$ $d$, contained in the derrick-frame, which wheels are arranged in two sets upon opposite sides of the standard, and mesh with the cogs of stationary wheel D, so that when turned by a crank, $s$, attached to one of them, they serve to rotate the working devices upon the wheel D as upon a turn-table. E is the snow-scoop, which is made with flanged rollers $e$ at its outer end, which rest upon the rails of the track when the machine is to be driven into the snow-bank, and $f$ are sharp curved blades, attached to the sides of the scoop, to make a clean easy cut through the snow. Said scoop is pivoted to a frame, F, which frame is pivoted to the derrick at $g$, so that the scoop can either be dumped upon its pivots or raised bodily with the frame F upon the pivots $g$. G is a bale, which is pivoted to and supports the scoop, and through which the scoop and its frame are raised and lowered by means of cord $h$, pulley $i$, and windlass $j$, located in the opposite end of the derrick-frame. H is a spring-catch, which extends over the rear edge of the scoop, and holds it down until the load is ready to be dumped. I is the tripping-lever, pivoted in the derrick-frame, and connected through a rod, $k$, with the spring-catch. When said lever is deflected the catch is withdrawn from the upper edge of the scoop, and the latter being pivoted between the center of gravity and its rear end, the dumping of the load is made automatic from the action of gravity. J is a windlass, and $k'$ a cord for restoring the scoop, after being dumped, to its proper position beneath the catch. Said windlass is made in two parts, with a clutch-coupling, $m$, and is provided with a shifting-lever, $l$, so that when the load of snow is to be dumped the cord runs readily off from the portion of the windlass freed from the clutch. K is the cut-off for the scoop. It consists of prongs or flattened tines $n$, arranged in the head of a frame, L, like rake-teeth, which frame is pivoted at $o$ to the derrick-frame, so that when the scoop is driven into the snow-bank, and the cut-off allowed to fall from the action of gravity, its tines pass down through the snow, and divide that which is in the scoop from the rest of the bank, so that the scoop-load may be readily lifted out entire. Said cut-off is elevated by means of a cord, $p$, passing over pulley $q$, and wound around windlass M, which windlass is made in two pieces, and provided with a detent, $d'$, clutch-coupling $r$, forming the connection between the parts, and a shifting-lever, $s'$, serving to connect or disconnect the same, so as to allow the cord to run off freely from the loose portion, and permit the cut-off to fall with force enough to drive its tines through the snow.

The operation of the above-described devices is as follows: When the track is obstructed by snow-drifts, the car with the snow-cleaning devices is placed in front of the locomotive, and the scoop lowered until its rollers rest upon the rails. In this position it is driven into the bank, the snow entering and filling the scoop. Coupling $r$ of windlass M is then disconnected by shifting-lever $s$, and the cord being free to run off the loose portion of the windlass, the cut-off falls of its own weight, and cuts off the proper load for the scoop. The scoop is then elevated by its windlass and cord, and the cut-off raised from the front of the same. In this position the car is run back, if necessary, and the derrick swung around to one side, in which position the spring-catch is withdrawn by the tripping-lever, and the scoop dumped. It is then restored to its former position, the derrick turned again to a longitudinal position, and the same action repeated.

In constructing the scoops we propose to make them of any size; but, ordinarily, they will be about twelve feet long and seven high, and of the same width as the track.

In cutting through deep drifts it will be necessary to take off the snow in layers from the top, for which kind of work the scoop may be readily adjusted through its cord and windlass.

By means of our devices operating as above described, obstructions in the shape of snow-drifts may be quickly removed from the railroad-tracks, and much of the embarrassment, delay, and danger produced thereby avoided.

Having thus described our invention, what we claim as new is—

1. The combination, with the car, having standard B, guideway $a$, and stationary cog-wheel D, of the derrick-frame C carrying the scoop, and having friction-wheels $b$, and gear-wheels $c\ d$, as and for the purpose described.

2. The combination, with the swinging derrick-frame, of the pivoted scoop E, pivoted frame F, bale G, cord $h$, pulley $i$, and windlass $j$, substantially as and for the purpose described.

3. The combination, with scoop E, frame F, and the derrick-frame, of the spring-catch H, tripping-lever I, connecting-rod $k$, cord $k'$, and windlass J, made in two sections, with a clutch-coupling and shifting-lever, substantially as and for the purpose described.

4. The combination, with the scoop E, of the cut-off K, pivoted frame L, cord $p$, pulley $q$, and windlass M, made in two pieces, and provided with a clutch-coupling, and a shifting-lever, as and for the purpose described.

SILAS T. BENTLEY.
JACOB ESTEP.

Witnesses:
ELIHU J. COFFIN,
JAMES THOMPSON.